United States Patent
Wang et al.

(10) Patent No.: US 12,535,145 B2
(45) Date of Patent: Jan. 27, 2026

(54) VALVE CAP FEATURING EASY INFLATION AND SEALING AND PRODUCTION PROCESS THEREOF

(71) Applicant: NINGBO SIMING AUTOMOTIVE Co., Ltd., Ningbo (CN)

(72) Inventors: Lihong Wang, Ningbo (CN); Ermald Muca, Ningbo (CN); Xinfeng Wang, Ningbo (CN)

(73) Assignee: NINGBO SIMING AUTOMOTIVE CO., LTD., Ningbo (CN)

( * ) Notice: Subject to any disclaimer, the term of this patent is extended or adjusted under 35 U.S.C. 154(b) by 0 days.

(21) Appl. No.: 18/824,958

(22) Filed: Sep. 5, 2024

(65) Prior Publication Data

US 2025/0251049 A1    Aug. 7, 2025

(30) Foreign Application Priority Data

Feb. 6, 2024 (CN) .......................... 202410169161.7

(51) Int. Cl.
| | |
|---|---|
| *B60C 29/06* | (2006.01) |
| *F16K 1/46* | (2006.01) |
| *F16K 15/20* | (2006.01) |

(52) U.S. Cl.
CPC ............ *F16K 15/205* (2013.01); *B60C 29/06* (2013.01); *B60C 29/066* (2013.01); *F16K 1/46* (2013.01); *Y10T 137/374* (2015.04)

(58) Field of Classification Search
CPC ..... Y10T 137/374; B60C 29/00; B60C 29/06; B60C 29/066
See application file for complete search history.

(56) References Cited

U.S. PATENT DOCUMENTS

| | | | | |
|---|---|---|---|---|
| 2,178,828 | A * | 11/1939 | Broecker | B60C 29/066 137/630.22 |
| 2,527,381 | A * | 10/1950 | St Clair | F16K 1/46 137/540 |
| 2,812,000 | A * | 11/1957 | Trinca | B60C 29/06 251/293 |
| 2,854,020 | A * | 9/1958 | Williams | B60C 23/0496 137/232 |
| 8,651,144 | B1 * | 2/2014 | Tsai | F16K 15/20 137/227 |
| 2019/0249790 | A1 * | 8/2019 | Zhang | B60C 29/066 |

* cited by examiner

*Primary Examiner* — Kevin F Murphy
(74) *Attorney, Agent, or Firm* — Bayramoglu Law Offices LLC

(57) ABSTRACT

A valve cap includes a cap housing, where a self-sealing inflation valve is provided in a chamber of the cap housing; the self-sealing inflation valve includes a valve core rod, a reset spring, a valve core sealing gasket, and a valve core base; the valve core base is mounted in a middle-lower part of the chamber; the valve core rod is movably provided in the chamber, and a lower end of the valve core rod penetrates into an inflation channel of the valve core base; a circular sealing protrusion is provided in the inflation channel; the valve core sealing gasket is sleeved on the valve core rod; the valve core sealing gasket is in a seal fit with the sealing protrusion; the reset spring is sleeved on the valve core rod; the lower end of the valve core rod is riveted to a valve core rivet joint.

7 Claims, 6 Drawing Sheets

VALVE CAP FEATURING EASY INFLATION AND SEALING AND PRODUCTION PROCESS THEREOF

CROSS REFERENCE TO THE RELATED APPLICATIONS

This application is based upon and claims priority to Chinese Patent Application No. 202410169161.7, filed on Feb. 6, 2024, the entire contents of which are incorporated herein by reference.

TECHNICAL FIELD

The present disclosure relates to the technical field of valve caps, and in particular to a valve cap featuring easy inflation and sealing and a production process thereof.

BACKGROUND

As a major component of a tire, valves are used to inflate and deflate tires. There is a valve core inside the valve. For inflation, the valve core is opened under the pressing action of the ejector rod of the inflation chuck. After inflation, the valve core is automatically closed for a sealing purpose under the action of the spring force. The valve cap is a dust cap located at the opening of the valve, and is mainly used to prevent dust from entering the valve to cause damage to the valve core. In the prior art, the valve cap has a single function, usually only the dust-proof function. Furthermore, the valve cap must be removed first when the tire needs to be inflated, while the valve cap is easily lost after being removed.

SUMMARY

A technical problem to be solved by the present disclosure is to provide a valve cap featuring easy inflation and sealing and a production process thereof in response to the current situation of the prior art. In the present disclosure, the valve cap has the advantages of simple structure, easy processing, secondary sealing, and inflation without the need to dismount the valve cap.

In order to solve the above-mentioned technical problem, the present disclosure adopts the following technical solutions.

A valve cap featuring easy inflation and sealing includes a cap housing, where a chamber axially runs through the cap housing; a self-sealing inflation valve is provided in the chamber, and the self-sealing inflation valve is automatically sealed in a normal state and is opened due to a pressing action of an ejector rod of an inflation chuck during inflation; the self-sealing inflation valve includes a valve core rod, a reset spring, a valve core sealing gasket, and a valve core base; the valve core base is positioned and mounted in a middle-lower part of the chamber; the valve core rod is movably provided in the chamber, and a lower end of the valve core rod penetrates into an inflation channel of the valve core base; a circular sealing protrusion is provided in the inflation channel; the valve core sealing gasket is positioned and sleeved on the valve core rod; the valve core sealing gasket is in a seal fit with the sealing protrusion through a spring force in the normal state; the reset spring is sleeved on the valve core rod to provide a sealing pressure for the valve core sealing gasket; the lower end of the valve core rod is riveted to a valve core rivet joint for fixing the valve core sealing gasket; an O-ring in a seal fit with a top surface of a valve is provided on an outer peripheral surface of a lower end of the valve core base; and the O-ring is made of a high-temperature silicone material and withstands a temperature up to 400 degrees Fahrenheit.

In order to optimize the above technical solution, the following specific measures are further adopted.

The chamber includes a valve stem chamber, a valve core base positioning chamber, and an internal thread chamber in sequence from top to bottom; the valve core base is positioned and mounted in an anti-rotation manner in the valve core base positioning chamber of the cap housing; the valve core rod is located in the valve stem chamber of the cap housing, and the lower end of the valve core rod extends into the valve core base positioning chamber; and an internal thread is provided in the internal thread chamber and is spirally fitted with the valve.

An outer peripheral surface of a middle-lower part of the cap housing is provided with an anti-slip pattern that is formed through rolling and eases manual rotation; and an outer peripheral surface of an upper part of the cap housing is provided with an anti-detachment tooth groove for preventing an inflation tube from detaching during inflation.

An outer peripheral surface of the valve core base is provided with a plurality of limiting teeth that are longitudinally and equidistantly formed to prevent the valve core base from rotating relative to the cap housing; and a top surface of the valve core base is provided with a raised element that is sleeved inside a lower end of the reset spring in a fitted manner.

The valve core rod includes a rod body and a pressure-bearing cap integrally formed at an upper end of the rod body; a positioning shoulder formed relatively adjacent to a lower end of the rod body is positioned in a seal fit with an upper end of the valve core sealing gasket; the reset spring is sleeved on the rod body of the valve core rod; an upper end of the reset spring is pressed against a bottom surface of the pressure-bearing cap, and the lower end of the reset spring is pressed against the top surface of the valve core base; and an upper end plane of the pressure-bearing cap is slightly higher than an upper end opening plane of the chamber.

An upper end of the valve core rivet joint is provided with a positioning recess; and the valve core sealing gasket is positioned and mounted in the positioning recess of the valve core rivet joint.

The sealing protrusion is alterable into a conical sealing slope; and in the normal state, the valve core sealing gasket is in a seal fit with the conical sealing slope through the spring force.

An electroplating protection layer is provided on each of an outer surface of the cap housing and an outer surface of the valve core rod.

The present disclosure further provides a production process of the valve cap featuring easy inflation and sealing, including the following steps:

a cutting step: performing cutting as needed to form a cap housing blank, a valve core rod blank, a valve core base blank, and a rivet joint blank;

a machining step: operating, according to a design requirement, a machining device to machine the cap housing blank into the cap housing, the valve core rod blank into the valve core rod, the valve core base blank into the valve core base, and the rivet joint blank into the valve core rivet joint;

an electroplating step: operating an electroplating device to electroplate the electroplating protection layer on the outer surfaces of the machined cap housing and valve core rod through a trivalent chromium electroplating process;

an inflation valve assembly step: sleeving the reset spring, the valve core base, the valve core sealing gasket, and the valve core rivet joint on the valve core rod in sequence; integrally riveting the valve core rivet joint and the valve core rod; and sleeving the O-ring on the outer peripheral surface of the valve core base to form the self-sealing inflation valve;

a molding assembly step: placing the assembled self-sealing inflation valve into the chamber of the cap housing to form a complete valve cap;

a sealing pressure test step: screwing the formed valve cap onto a test nozzle of a testing device, and switching on an air source in a reverse direction to test sealing performance between the valve core sealing gasket and the sealing protrusion;

a flow rate test step: switching on, after the sealing pressure test step is performed by switching on the air source in the reverse direction, the air source in a forward direction to test a ventilation flow rate when the valve core sealing gasket is opened for inflation; and a finished product packing step: packing and storing the valve cap obtained after passing the test, thereby finishing the production of the valve cap featuring easy inflation and sealing.

A thickness of the electroplating protection layer is 5-10 μm.

Compared with the prior art, the present disclosure has the following advantages. A self-sealing inflation valve is provided in the cap housing and automatically seals in a normal state and opens through the pressing action of the ejector rod of the inflation chuck during inflation. The self-sealing inflation valve includes a valve core rod, a reset spring, a valve core sealing gasket, and a valve core base. In the present disclosure, the self-sealing inflation valve automatically seals in a non-inflation condition, achieving a secondary sealing function of the valve cap. That is, in case the valve core leaks, the self-sealing inflation valve prevents tire leakage through the secondary sealing function. In the present disclosure, there is no need to remove the valve cap for inflation. When inflation is needed, the inflation tube is directly connected to the valve cap. Under the pressing action of the ejector rod of the inflation chuck, the self-sealing inflation valve opens the inflation channel to inflate the tire.

DETAILED DESCRIPTION OF THE EMBODIMENTS

Figure 1:
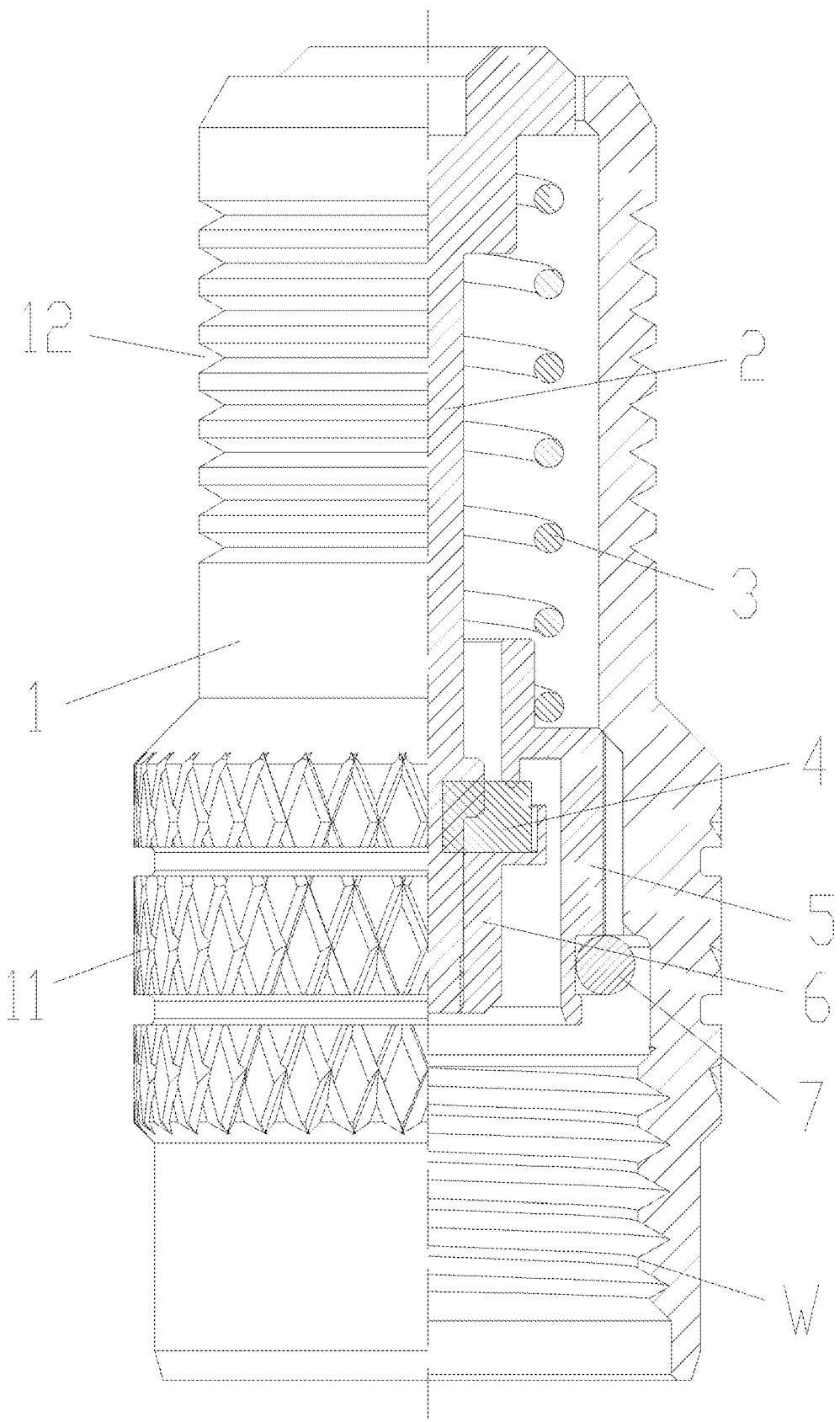
FIG. 1 is a half-sectional view of a valve cap featuring easy inflation and sealing according to the present disclosure.

The embodiments of the present disclosure are further described in detail below with reference to the drawings.

FIGS. 1 to 6 show the structure and process flowchart of the present disclosure.

Reference Numerals: W. internal thread; 1. cap housing; 1*a*. valve stem chamber; 1*b*. valve core base positioning chamber; 1*c*. internal thread chamber; 11. anti-slip pattern; 12. anti-detachment tooth groove; 2 valve core rod; 21. rod body; 22. pressure-bearing cap; 23. positioning shoulder; 3. reset spring; 4 valve core sealing gasket; 5. valve core base; 51. sealing protrusion; 51. conical sealing slope; 52. limiting tooth; 53. raised element; 6 valve core rivet joint; 6*a*. positioning recess; and 7. O-ring.

The traditional valve cap only has a dust-proof function. When it is necessary to inflate the tire, the valve cap must be removed, and can easily lose after being removed. The present disclosure provides a valve cap featuring easy inflation and sealing. The valve cap has a secondary sealing function and a non-dismounted inflation function in addition to the traditional dust-proof function. In the present disclosure, the valve cap can inflate the tire without dismounting the valve cap. In the present disclosure, in case a valve core of the tire leaks, the valve cap can utilize its self-sealing performance to prevent air leakage, ensuring the driving safety of the vehicle.

Figure 2:
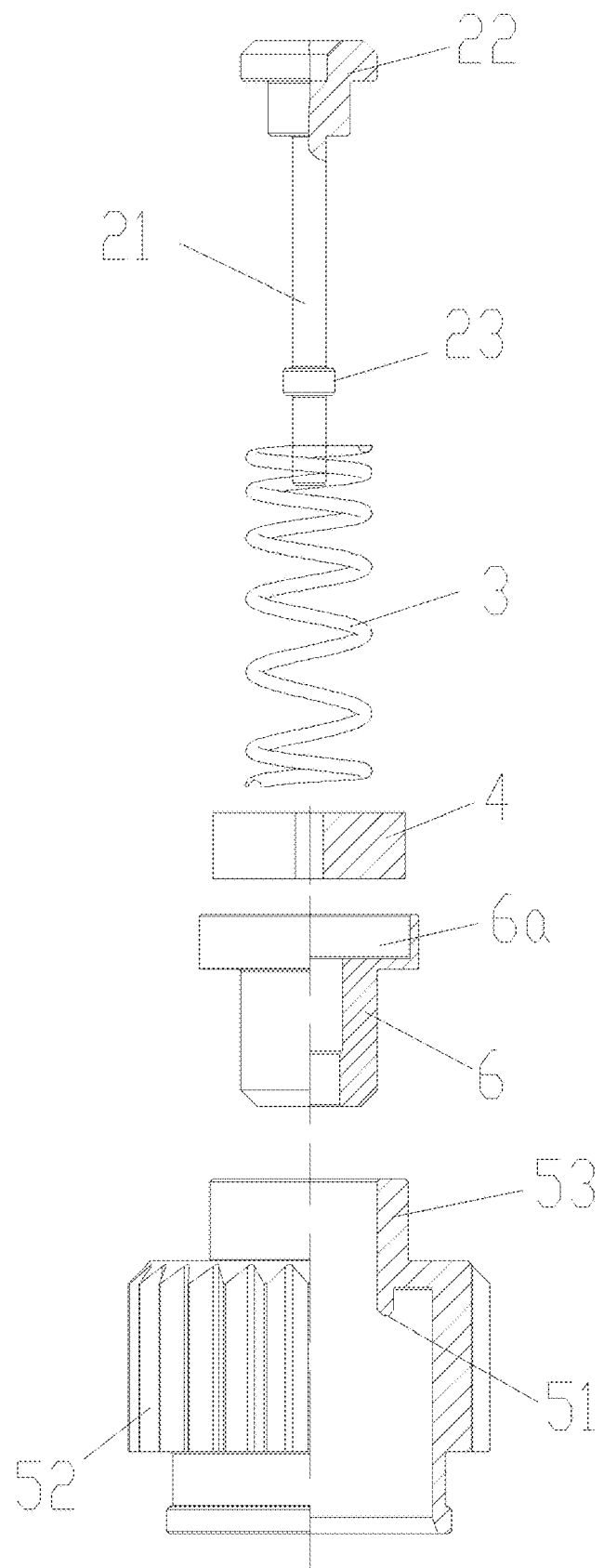
FIG. 2 is an exploded view of a self-sealing inflation valve according to the present disclosure.
Figure 3:
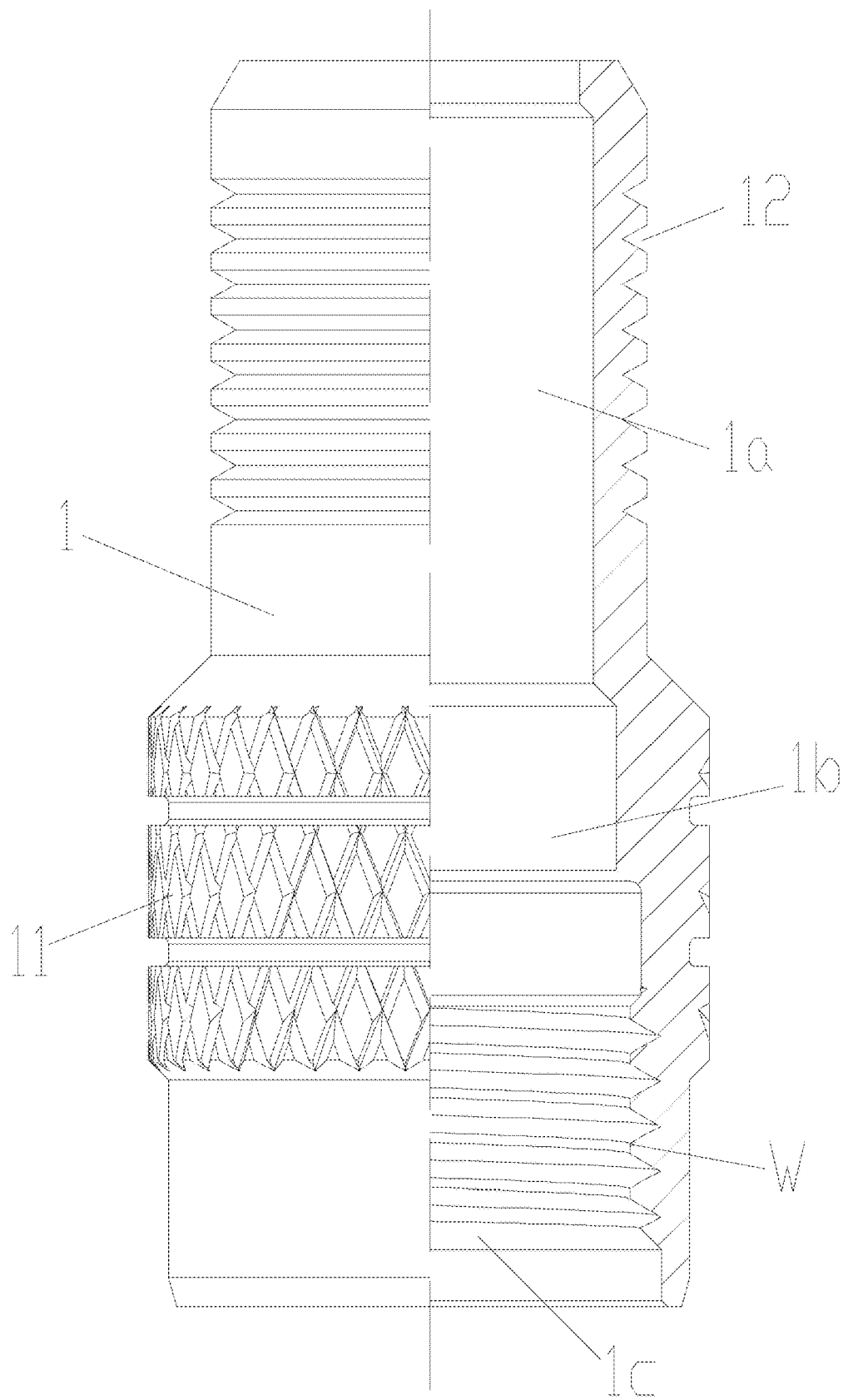
FIG. 3 is a half-sectional view of a cap housing according to the present disclosure.
Figure 4:
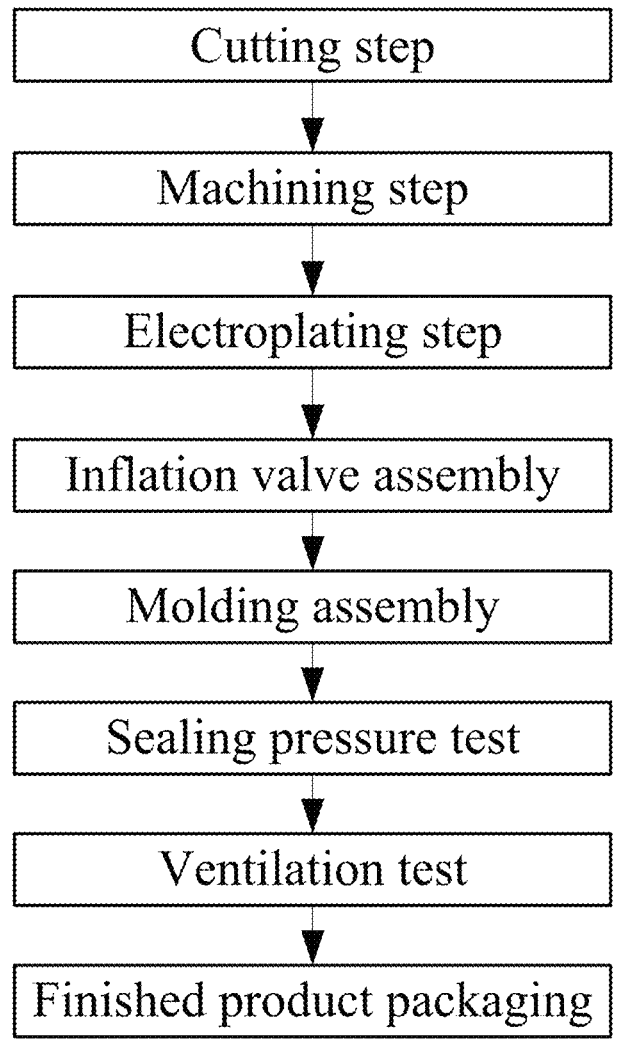
FIG. 4 is a process flowchart of the present disclosure.

As shown in FIGS. 1 to 3, in the present disclosure, the valve cap includes cap housing 1, and a chamber axially runs through the cap housing 1. A self-sealing inflation valve is provided in the chamber. The self-sealing inflation valve is automatically sealed in a normal state and is opened due to a pressing action of an ejector rod of the inflation chuck during inflation, achieving a secondary sealing function and a non-dismounted inflation function. The self-sealing inflation valve includes valve core rod 2, reset spring 3, valve core sealing gasket 4, and valve core base 5. The valve core base 5 is positioned and mounted in a middle-lower part of the chamber. The valve core rod 2 flexibly passes through an upper part of the chamber, and a lower end of the valve core rod 2 penetrates into an inflation channel of the valve core base 5. The inflation channel is a stepped hole that runs through axially. A circular sealing protrusion 51 is formed at a step of the stepped hole. A center of the valve core sealing gasket 4 is provided with a hole for inserting the valve core rod 2. The valve core sealing gasket 4 is positioned, for sealed insertion, on a lower part of the valve core rod 2. Under a force of the reset spring 3, the valve core sealing gasket 4 is in a seal fit with the sealing protrusion 51 in the normal state to seal the inflation channel and prevent air leakage from a tire. The reset spring 3 is sleeved on the valve core rod 2 to provide a sealing pressure for the valve core sealing gasket 4. The lower end of the valve core rod 2 is riveted to valve core rivet joint 6 for fixing the valve core sealing gasket 4. The valve core rivet joint 6 exerts a positioning and anti-deformation effect on the valve core sealing gasket 4 to prevent the valve core sealing gasket 4 from moving downward. O-ring 7 is provided on an outer peripheral surface of a lower end of the valve core base 5. The O-ring 7 is in a seal fit with a top surface of the valve, and is configured to prevent air leakage at a connection between the cap housing 1 and the valve. Optimally, the O-ring is made of a high-temperature silicone material and can withstand temperatures up to 400 degrees Fahrenheit.

In the embodiment of the present disclosure, as shown in FIG. 3, the chamber includes valve stem chamber 1*a*, valve core base positioning chamber 1b, and internal thread chamber 1c in sequence from top to bottom. An upper end of the valve stem chamber 1a is closed, and the valve core base positioning chamber 1b is a two-stage stepped chamber. The valve core base 5 is positioned and mounted in an anti-rotation manner in the valve core base positioning chamber 1b of the cap housing 1. The valve core rod 2 is located in the valve stem chamber 1a of the cap housing 1, and the lower end of the valve core rod 2 extends into the valve core base positioning chamber 1b. Internal thread W is provided in the internal thread chamber 1c and is spirally fitted with the valve.

In the embodiment of the present disclosure, an anti-slip layer is provided on an outer peripheral surface of the middle-lower part of the cap housing 1. The anti-slip layer is provided with anti-slip pattern 11 that is formed through rolling and eases manual rotation of the cap housing 1. The anti-slip pattern 11 facilitates the dismounting and mounting of the valve cap. In addition, an outer peripheral surface of an upper part of the cap housing 1 is provided with anti-detachment tooth groove 12. The anti-detachment tooth groove 12 is configured to prevent an inflation tube connected to the cap housing 1 from detaching during inflation.

In the embodiment of the present disclosure, as shown in FIG. 2, the outer peripheral surface of the valve core base 5 is provided with a plurality of limiting teeth 52 that are longitudinally and equidistantly formed. The valve core base positioning chamber 1b of the cap housing 1 is provided with limiting tooth grooves that are in an engagement fit with the limiting teeth 52 of the valve core base 5. The limiting teeth 52 are fit with the limiting tooth grooves to prevent the valve core base 5 from rotating relative to the cap housing 1. A top surface of the valve core base 5 is provided with annular raised element 53. The raised element 53 also serves as a spring base, and a lower end of the reset spring 3 is sleeved on the raised element 53.

In the embodiment of the present disclosure, the valve core rod 2 is a one-piece component. The valve core rod 2 includes rod body 21 and pressure-bearing cap 22 integrally formed at an upper end of the rod body 21. Positioning shoulder 23 is formed relatively adjacent to a lower end of the rod body 21. A diameter of the positioning shoulder 23 is larger than a diameter of the rod body 21, in order to fit with an upper end of the valve core sealing gasket 4 in a sealed and positioned manner. The positioning shoulder 23 is fit with the valve core rivet joint 6 to prevent the valve core sealing gasket 4 from moving up and down. In the present disclosure, the reset spring 3 is sleeved on the rod body 21 of the valve core rod 2, and an upper end of the reset spring 3 is pressed against a bottom surface of the pressure-bearing cap 22, while a lower end of the reset spring 3 is pressed against the top surface of the valve core base 5. An upper end plane of the pressure-bearing cap 22 is slightly higher than an upper end opening plane of the chamber.

In the embodiment of the present disclosure, an upper end of the valve core rivet joint 6 is provided with positioning recess 6a. The valve core sealing gasket 4 is positioned and mounted in the positioning recess 6a of the valve core rivet joint 6. The positioning recess 6a is configured to protect the valve core sealing gasket 4 from excessive deformation under pressure.

Figure 5:
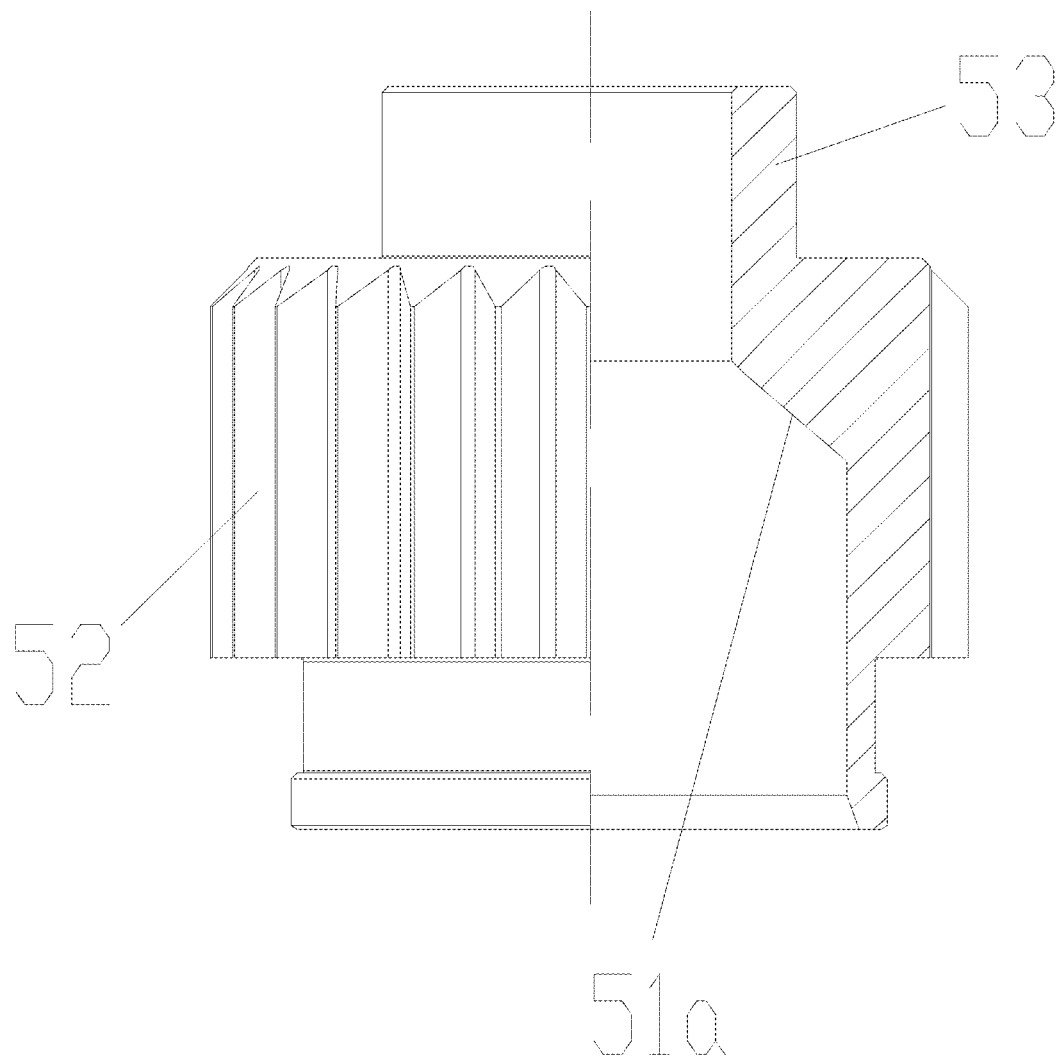
FIG. 5 is a half-sectional view of a valve core base with a conical sealing slope according to the present disclosure.
Figure 6:
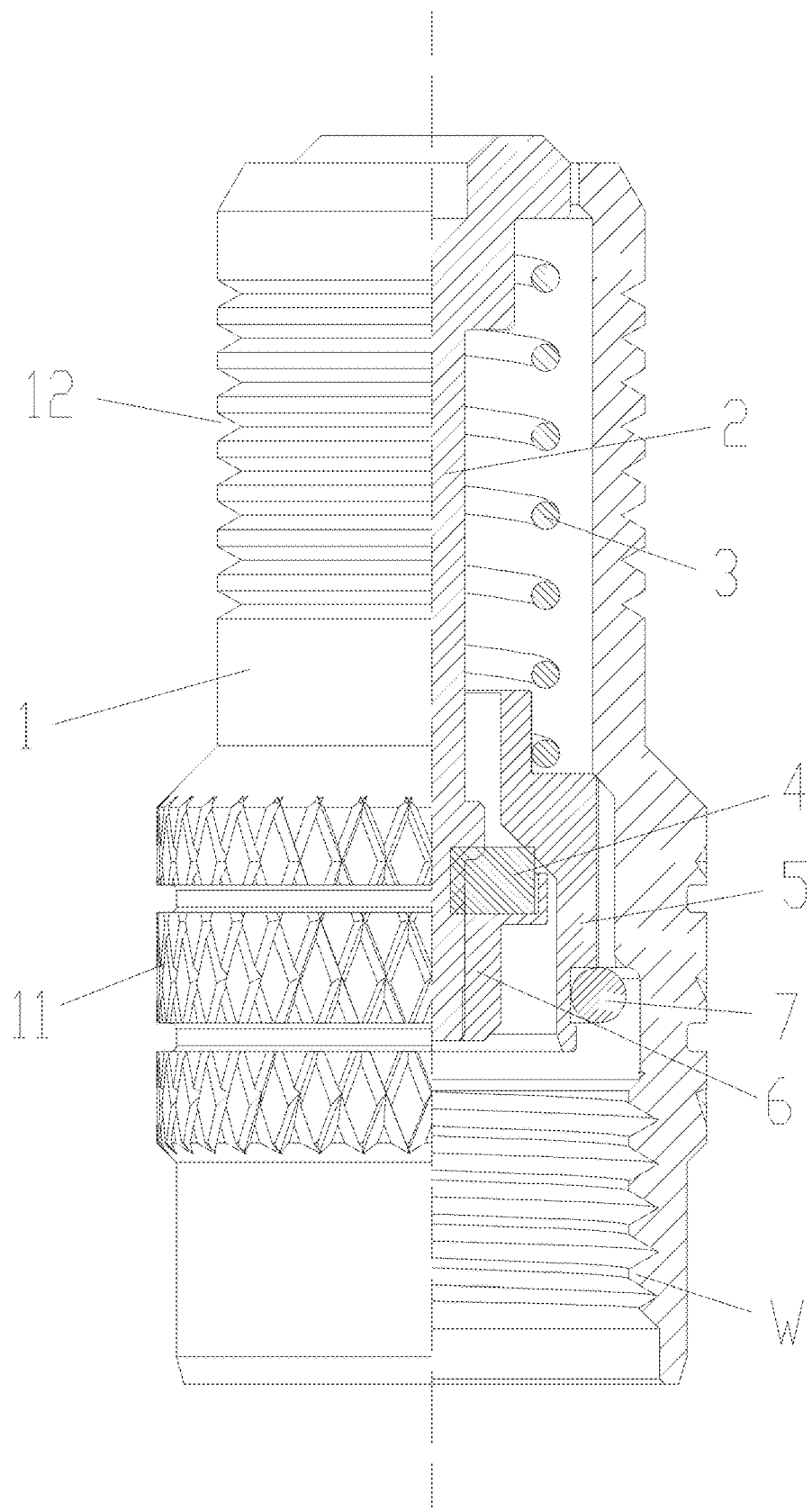
FIG. 6 is a half-sectional view of the valve cap provided with the valve core base with the conical sealing slope according to the present disclosure.

In the embodiment of the present disclosure, as shown in FIGS. 5 and 6, the sealing protrusion 51 can also be altered or designed into a structure of conical sealing slope 51a. In a normal state, the valve core sealing gasket 4 is in a seal fit with the conical sealing slope 51a through the spring force.

In the embodiment of the present disclosure, an electroplating protection layer is provided on each of an outer surface of the cap housing 1 and an outer surface of the valve core rod 2.

In the embodiment of the present disclosure, there is a ventilation space between the inflation channel of the valve core rod 2 and the valve core base 5. The diameter of the rod body 21 is 1.2 mm, the diameter of a smallest hole in the inflation channel is 2.5 mm, and the ventilation space is 1.8 mm$^2$. A ventilation space of 2.4 mm$^2$ is designed between the valve core rivet joint 6 and a largest hole of the inflation channel. After the valve core sealing gasket 4 is opened, the ventilation flow rate is greater than 120 L/min.

In the embodiment of the present disclosure, the valve core rod 2 and the valve core rivet joint 6 are connected by a riveting process. A tension after riveting is greater than 120 N·m to ensure the connection firmness and avoid the risk of detachment.

In the embodiment, the valve core rod 2 is riveted to the valve core rivet joint 6, and a bottom plane of the valve core rod after assembly is 0.3-0.5 mm away from a bottom plane of the valve core base 5. After the valve cap is mounted on the valve, the valve core rod 2 will not directly push open the valve core in the valve when it is static.

In the embodiment of the present disclosure, optimally, after the valve core rod 2 is assembled with the cap housing 1, the upper end plane of the pressure-bearing cap 22 exceeds the upper end opening plane of the chamber by 0.5-1 mm. After an inflation chuck of the inflation tube is mounted on the cap housing 1, a pushing stroke of the valve core rod 2 is 1.5-2 mm to effectively open the valve core for inflation.

The present disclosure further provides a production process of the valve cap featuring easy inflation and sealing, including the following steps.

In a cutting step, cutting is performed as needed to form a cap housing blank, a valve core rod blank, a valve core base blank, and a rivet joint blank.

In a machining step, according to a design requirement, a machining device is operated to machine the cap housing blank into the cap housing 1, the valve core rod blank into the valve core rod 2, the valve core base blank into the valve core base 5, and the rivet joint blank into the valve core rivet joint 6.

In an electroplating step, an electroplating device is operated to electroplate the electroplating protection layer on the outer surfaces of the machined cap housing 1 and the valve core rod 2 through a trivalent chromium electroplating process.

In an inflation valve assembly step, the reset spring 3, the valve core base 5, valve core sealing gasket 4, and the valve core rivet joint 6 are sleeved on the valve core rod 2 in sequence. The valve core rivet joint 6 and the valve core rod 2 are integrally riveted. The O-ring 7 is sleeved on the outer peripheral surface of the valve core base to form the self-sealing inflation valve.

In a molding assembly step, the assembled self-sealing inflation valve is placed into the chamber of the cap housing 1 to form a complete valve cap.

In a sealing pressure test step, the formed valve cap is screwed onto a test nozzle of a testing device, and an air source is switched on in a reverse direction to test sealing performance between the valve core sealing gasket 4 and the sealing protrusion 51.

In a flow rate test step, after the sealing pressure test step is performed by switching on the air source in the reverse direction, the air source is switched on in a forward direction to test a ventilation flow rate when the valve core sealing gasket 4 is opened for inflation.

In a finished product packing step, the valve cap obtained after passing the test is packed and stored, thereby finishing the production of the valve cap featuring easy inflation and sealing.

In the present disclosure, a thickness of the electroplating protection layer is 5-10 μm.

In the present disclosure, the sealing pressure test is as follows. The valve cap is mounted on the test valve (without the valve core) with a torque of 0.3 N·m, and the valve cap and a test fixture are put into a water tank. An air pressure of 1.4 Mpa is filled. If there is no leakage in 60 s, then the air source is switched off, and the valve core rod is pressed down three times with a stroke of 3 mm. It is required that reset be smooth without any lag. Then the test device is put into the water tank, and it is observed whether there are no bubbles escaping.

In the flow rate test, the valve cap is mounted on a gas flow meter. Compressed air with a pressure of 0.69 Mpa is introduced at a temperature of 20° C. and a relative humidity of 65%, and a ventilation flow rate of greater than 120 L/min is measured.

In the present disclosure, after the flow rate test, a high- and low-temperature sealing test, a fatigue resistance test, and a salt spray test are further performed.

In the high- and low-temperature sealing test, the valve cap that has passed the flow rate test, together with the fixture and testing ethanol, is put into a low-temperature chamber at −5° C. After 24 h, the valve cap and the fixture are put into −40° C. ethanol, and 0.85 Mpa compressed air is introduced. It is observed whether there are no bubbles escaping from the ethanol in 60 s at the connection between the valve cap and the valve. After passing the low-temperature test, the valve cap, together with the fixture, is put into a high-temperature chamber at 100+5° C. After 24 h, the valve cap and fixture are immersed in water at 60±5° C. 0.85 Mpa compressed air is introduced. It is observed whether there are no bubbles escaping at a connection between a cap end of the valve and the valve in 60 s.

In the fatigue resistance test, the valve cap is mounted on the valve body, and 690 kPa compressed gas is introduced. The valve core rod is pressed up to 120 times. Then the valve cap is put into clean water at 23±5° C. It is observed and recorded whether there are bubbles escaping from the opening of the valve in 60 s.

In the salt spray test, the valve cap is put into a neutral salt spray test chamber (reference standard: GB/T 2423-17). It is observed whether there is no rust or spot defect on the surface in 144 h.

The working principle of the present disclosure is as follows. The valve cap is screwed on the valve of the tire through the internal thread W, and the O-ring 7 ensures the sealed connection between the valve cap and the valve. Under the action of the reset spring 3, the valve core sealing gasket 4 is in a seal fit with the sealing protrusion 51 or the conical sealing slope 51, such that the inflation channel is closed. Therefore, when there is air leakage from the valve core inside the valve, the air leaked from the valve core cannot escape, achieving a secondary sealing effect. When inflation is needed, there is no need to remove the valve cap, just to clamp and connect the inflation chuck to the cap housing 1. The ejector rod of the inflation chuck can push the valve core rod 2 to compress the reset spring 3, driving the valve core sealing gasket 4 to move downward. In this way, the valve core sealing gasket 4 is detached from the sealing protrusion 51 or the conical sealing slope 51 to open the inflation channel for inflation. After the inflation is finished, the inflation tube is removed. After the inflation tube is removed, the valve core rod 2 loses pressure. Under the action of the reset spring 3, the valve core sealing gasket 4 moves upward. Thus, the inflation channel is closed.

The optimal embodiment of the present disclosure has been explained, and various changes or modifications made by those of ordinary skill in the art shall not depart from the scope of the present disclosure.

What is claimed is:

1. A valve cap featuring easy inflation and sealing, comprising a cap housing, wherein a chamber axially runs through the cap housing; a self-sealing inflation valve is provided in the chamber, and the self-sealing inflation valve is automatically sealed in a normal state and is opened due to a pressing action of an ejector rod of an inflation chuck during inflation; the self-sealing inflation valve comprises a valve core rod, a reset spring, a valve core sealing gasket, and a valve core base; the valve core base is positioned and mounted in a middle-lower part of the chamber; the valve core rod is movably provided in the chamber, and a lower end of the valve core rod penetrates into an inflation channel of the valve core base; a circular sealing protrusion is provided in the inflation channel; the valve core sealing gasket is positioned and sleeved on the valve core rod; the valve core sealing gasket is in a seal fit with the circular sealing protrusion through a spring force in the normal state; the reset spring is sleeved on the valve core rod to provide a sealing pressure for the valve core sealing gasket; the lower end of the valve core rod is riveted to a valve core rivet joint for fixing the valve core sealing gasket; and an O-ring in a seal fit with a top surface of a valve is provided on an outer peripheral surface of a lower end of the valve core base, wherein the chamber comprises a valve stem chamber, a valve core base positioning chamber, and an internal thread chamber in sequence from top to bottom; the valve core base is positioned and mounted in an anti-rotation manner in the valve core base positioning chamber of the cap housing; the valve core rod is located in the valve stem chamber of the cap housing, and the lower end of the valve core rod extends into the valve core base positioning chamber; and an internal thread is provided in the internal thread chamber and is spirally fitted with the valve, wherein an outer peripheral surface of a middle-lower part of the cap housing is provided with an anti-slip pattern, wherein the anti-slip pattern is formed through rolling and eases manual rotation; and an outer peripheral surface of an upper part of the cap housing is provided with an anti-detachment tooth groove for preventing an inflation tube from detaching during inflation, wherein an outer peripheral surface of the valve core base is provided with a plurality of limiting teeth, wherein the plurality of limiting teeth are longitudinally and equidistantly formed to prevent the valve core base from rotating relative to the cap housing; and a top surface of the valve core base is provided with a raised element, wherein the raised element is sleeved inside a lower end of the reset spring in a fitted manner.

2. The valve cap featuring easy inflation and sealing according to claim 1, wherein the valve core rod comprises a rod body and a pressure-bearing cap integrally formed at an upper end of the rod body; a positioning shoulder formed relatively adjacent to a lower end of the rod body is positioned in a seal fit with an upper end of the valve core sealing gasket; the reset spring is sleeved on the rod body of the valve core rod; an upper end of the reset spring is pressed against a bottom surface of the pressure-bearing cap, and the lower end of the reset spring is pressed against the top surface of the valve core base; and an upper end plane of the pressure-bearing cap is slightly higher than an upper end opening plane of the chamber.

3. The valve cap featuring easy inflation and sealing according to claim 2, wherein an upper end of the valve core rivet joint is provided with a positioning recess; and the valve core sealing gasket is positioned and mounted in the positioning recess of the valve core rivet joint.

4. The valve cap featuring easy inflation and sealing according to claim 3, wherein the circular sealing protrusion is alterable into a conical sealing slope; and in the normal state, the valve core sealing gasket is in a seal fit with the conical sealing slope through the spring force.

5. The valve cap featuring easy inflation and sealing according to claim 4, wherein an electroplating protection layer is provided on each of an outer surface of the cap housing and an outer surface of the valve core rod.

6. A production process of the valve cap featuring easy inflation and sealing according to claim 5, comprising the following steps:

a cutting step: performing cutting as needed to form a cap housing blank, a valve core rod blank, a valve core base blank, and a rivet joint blank;

a machining step: operating, according to a design requirement, a machining device to machine the cap housing blank into the cap housing, the valve core rod blank into the valve core rod, the valve core base blank into the valve core base, and the rivet joint blank into the valve core rivet joint;

an electroplating step: operating an electroplating device to electroplate the electroplating protection layer on the outer surface of the cap housing and the outer surface of the valve core rod through a trivalent chromium electroplating process;

an inflation valve assembly step: sleeving the reset spring, the valve core base, the valve core sealing gasket, and the valve core rivet joint on the valve core rod in sequence; integrally riveting the valve core rivet joint and the valve core rod; and sleeving the O-ring on the outer peripheral surface of the valve core base to form the self-sealing inflation valve;

a molding assembly step: placing the self-sealing inflation valve into the chamber of the cap housing to form the valve cap;

a sealing pressure test step: screwing the valve cap onto a test nozzle of a testing device, and switching on an air source in a reverse direction to test sealing performance between the valve core sealing gasket and the circular sealing protrusion;

a flow rate test step: switching on, after the sealing pressure test step is performed by switching on the air source in the reverse direction, the air source in a forward direction to test a ventilation flow rate when the valve core sealing gasket is opened for inflation; and a finished product packing step: packing and storing the valve cap obtained after passing the pressure test and the rate test, thereby finishing the production of the valve cap featuring easy inflation and sealing.

7. The production process according to claim 6, wherein a thickness of the electroplating protection layer is 5 μm-10 μm.

\* \* \* \* \*